Figure 10:
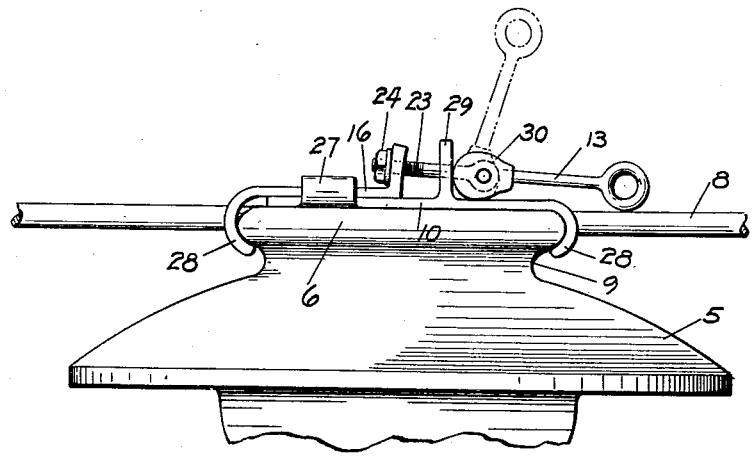

March 18, 1930.  R. G. DICKINSON  1,750,880
TIE CLAMP FOR ELECTRIC INSULATORS
Original Filed Sept. 8, 1925  3 Sheets-Sheet 1
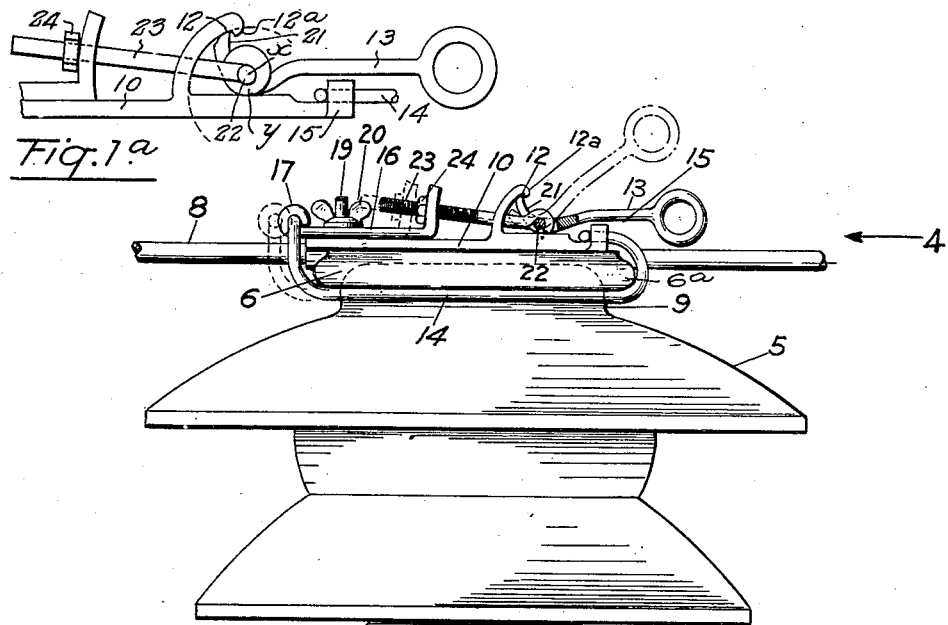
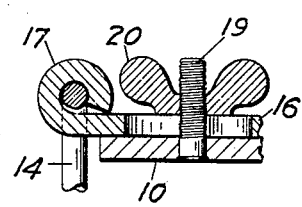
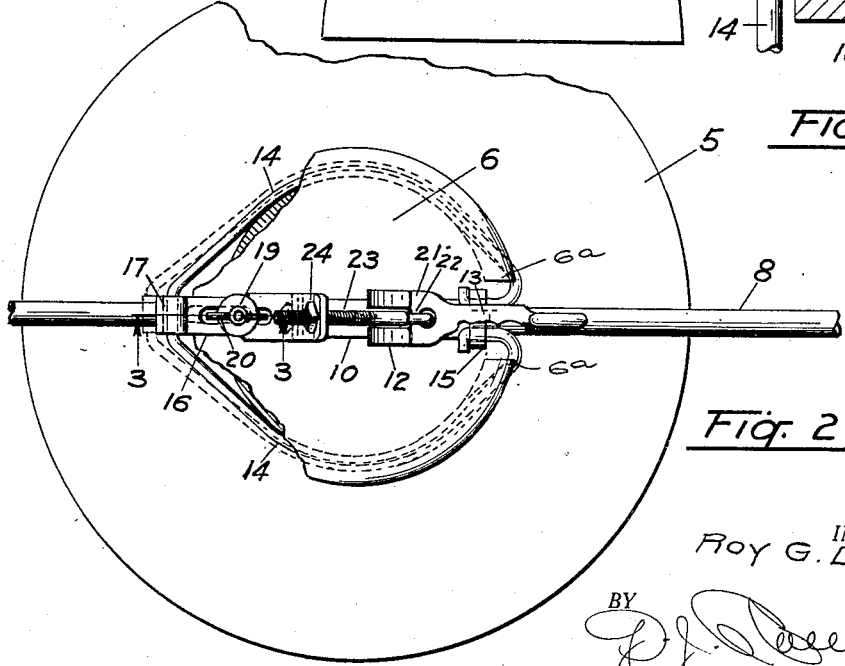
INVENTOR.
Roy G. Dickinson
BY
ATTORNEY.

March 18, 1930. R. G. DICKINSON 1,750,880
TIE CLAMP FOR ELECTRIC INSULATORS
Original Filed Sept. 8, 1925  3 Sheets-Sheet 2
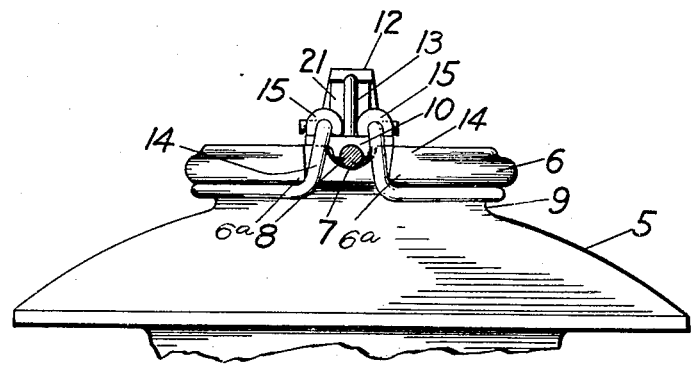
Fig. 4
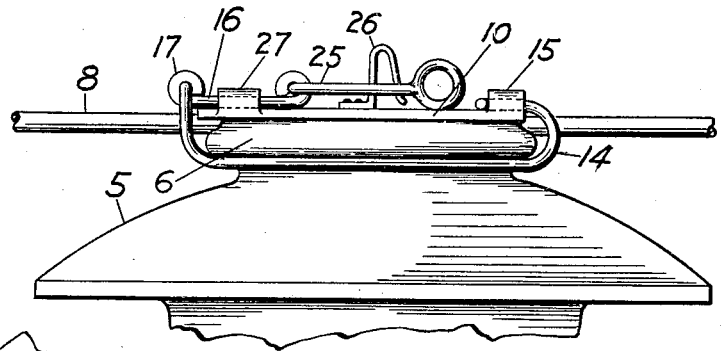
Fig. 5
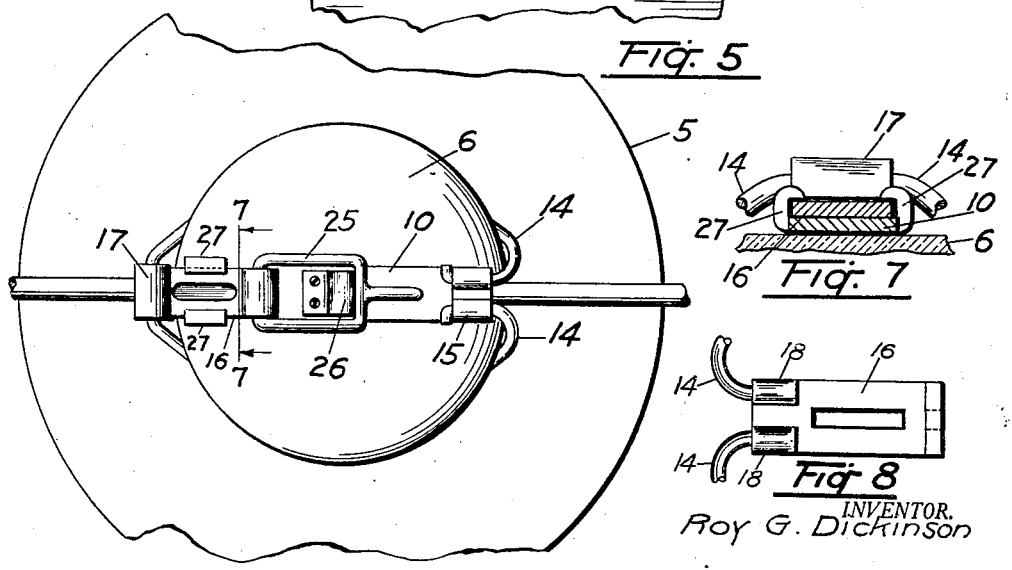
Fig. 6    Fig. 7    Fig. 8
INVENTOR.
Roy G. Dickinson
BY
ATTORNEY.

March 18, 1930.    R. G. DICKINSON    1,750,880
TIE CLAMP FOR ELECTRIC INSULATORS
Original Filed Sept. 8, 1925    3 Sheets-Sheet 3

INVENTOR.
Roy G. Dickinson
BY
ATTORNEY.

Patented Mar. 18, 1930

1,750,880

UNITED STATES PATENT OFFICE

ROY G. DICKINSON, OF DENVER, COLORADO, ASSIGNOR OF ONE-THIRD TO CHARLES A. SEMRAD, OF DENVER, COLORADO, AND ONE-THIRD TO HENRY C. REAGAN, OF BOULDER, COLORADO

TIE CLAMP FOR ELECTRIC INSULATORS

Application filed September 8, 1925, Serial No. 55,084. Renewed August 6, 1929.

This invention relates to tie clamps for electric line insulators and its principal object is to provide a simple and practical device to fasten an electric line wire to the insulators upon which it is supported.

The present method of fastening a line wire is to secure it by what is commonly known as a tie-wire which is a piece of copper wire passed around the insulator and twisted on the line wire. The main objection to the use of tie-wires of the above described character, aside from the time and labor involved in their application, is that they are generally broken and discarded when removed and that they hold the line-wire rigidly in position thereby preventing its longitudinal self-adjustment necessitated by expansion and contraction under varying temperatures and by changes in the position of the poles upon which the line is mounted.

It is the aim of the present invention to eliminate all of the above stated objectionable features in the aforesaid method of securing the line wire upon the insulator, by a mechanically operating clamp device which secures or releases the wire by a simple adjustment of an operating member and which permits the wire to "run" or move longitudinally for its adjustment to varying conditions as hereinbefore explained.

Another advantage of the present invention resides in the facility with which it is detached in case of trouble or renewal of the insulator and still another feature of the mechanical tie-clamp resides in its ready adjustability to line wires of different sizes.

With the above and other objects in view, all of which will clearly appear in the course of the following description, my invention consists in the novel arrangement and construction of parts illustrated in the accompanying drawings in the several views of which like parts are similarly designated and in which—

Figure 1 represents a side elevation of the tie-clamp in its operative position relative to a line wire and an insulator upon which the latter is supported;

Fig. 1ª is an enlarged detail view of clamp operating mechanism shown in Fig. 1.

Figure 2, a fragmentary plan view of the parts shown in Figure 1;

Figure 3, an enlarged section taken on the line 3—3, Figure 2;

Figure 4, an elevation of the parts shown in Figure 1 looking in the direction of the arrow 4;

Figure 5, a view similar to that of Figure 1, showing a modified construction of the clamp;

Figure 6, a plan view of the construction illustrated in Figure 5;

Figure 7, an enlarged section along the line 7—7, Figure 6;

Figure 8, a fragmentary view showing a modified method of attaching the clamp wires comprised in the invention, to the movable member with which they are associated.

Figure 9:
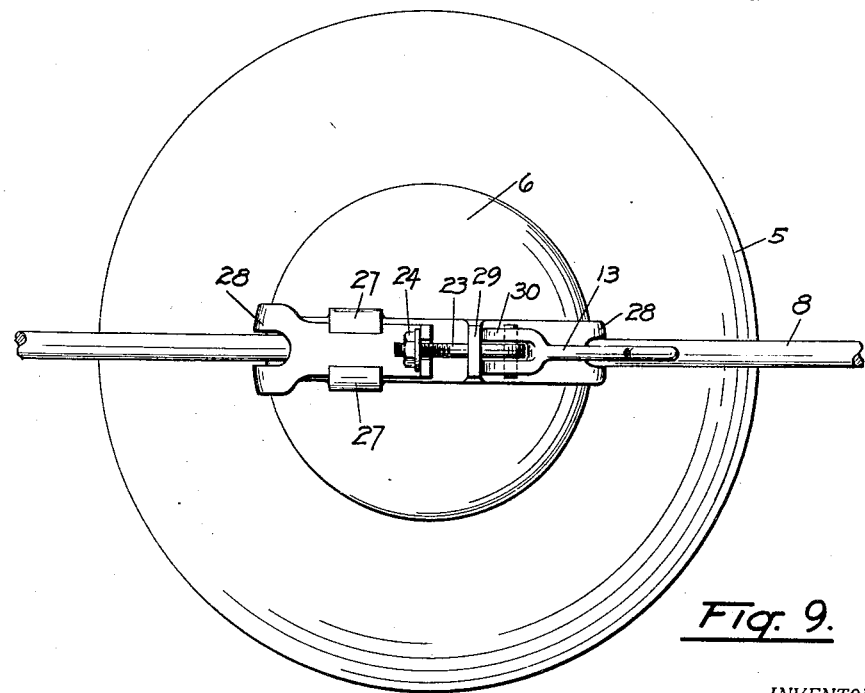

Figure 9, a plan view of another modified form of the tie clamp; and

Figure 10, a side elevation of the construction shown in Figure 9.

Referring first to Figures 1 to 4 of the drawings, the reference character 5 designates a standard electric insulator of the type used for high tension service.

The circular top 6 of the insulator is diametrically grooved to provide a seat 7 for the line wire 8 and it has immediately below its grooved portion, a circumferential depression 9 to which both in prior usage and in the present instance, the means for fastening the line wire upon the insulator, are applied.

The tie-clamp of my invention as shown in Figures 1 to 4, consists of a narrow base plate 10 upon which the clamping mechanism is assembled.

The plate lies in practice upon the top of the insulator lengthwise of the groove 7 and thereby forms a bridge or cover which holds the line wire to its seat.

Inasmuch as the line wire usually projects slightly above the flat upper surface of the insulator, the base plate is longitudinally grooved at its underside to engage with the wire, as clearly shown in Figure 4. The contact of the base plate subjects the line wire to a certain amount of tension by the clamping action of the mechanism hereinafter to be described, but it is to be understood that this tension is at no time sufficiently resistant to prevent longitudinal movement of the wire by contraction or expansion or under unusual stress.

The base plate has a fixed curved and bifurcated head 12 forming an abutment for a bent toggle lever 13 which controls the position of two clamp-members 14 in the circumferential groove 9 of the insulator.

The clamp-members are preferably made of spring-wire in the form of laterally spreading wings adapted to conjointly embrace the insulator in its circumferential depression and they are usually made of a single length of wire bent and curved to the required shape. The clamp-members are at one end pivotally attached in an apertured lug 15 of the base plate 10 and their opposite ends formed integrally by a bend of the wire, are similarly connected with a sliding push head 16 by means of a transverse eye at an end 17 thereof.

It will be noted that the groove 7 terminates between two shoulders 6ª formed by cutting away the circular top 6 of the insulator and the clamp members 14 are bent to hook around these shoulders 6ª, as will be obvious from Fig. 4, thereby precluding any possibility of the clamp members slipping over the portion 6.

The connection with the push bar may, however, be likewise established through the medium of two longitudinally apertured lugs 18 to receive the separated ends of the clamp-members as illustrated in Figure 8.

The push head 16 consists of a bar longitudinally slotted to admit a stud bolt 19 on the base plate 10, which in co-operation with a wing nut 20, guides the bar to slide lengthwise of the base.

The toggle lever 13 hereinbefore referred to, is forked as at 21 to engage with the corresponding parts of the bifurcated stationary head 12 on the base plate, and it is by means of a transverse pin 22 at the base of its fork, pivotally connected with the eye-shaped head of a screw-threaded link 23 which extends freely through the space between the parts of the stationary head and a therewith alined opening in the upturned end of the sliding head 16.

A nut 24 on the link engaging with the sliding head, provides an adjustable shoulder which determines the effective length of the link in the operation of the toggle of which it is a part, and shoulders 12ª at the ends of the parts of the curved stationary head, provide stops which limit the operative movement of the lever 13 of the toggle.

In the operation of the tie clamp, the base plate is placed lengthwise upon the line wire seated in the groove of the insulator with the toggle lever in the raised position and the clamp-members in the circumferential groove below the head of the insulator.

By pushing the lever downwardly to the position shown in full lines in Figure 1, the sliding head is drawn toward the fixed head 12. When the lever reaches its lowermost position, the forked extremity of the lever is in engagement with the bifurcated stationary head on the base plate, and the tie clamp is locked in position on the line wire.

It will be noted that this toggle action is permitted, due to the fact that the head 12 is formed from one center, and the pivot 22 forms another center about which the lever 21 is movable. These centers are designated at X—Y in Fig. 1ª.

The movement of the sliding head causes the ends of the resilient clamp-members to approach each other with the result that the members are forced upwardly against the underside of the top of the insulator and thereby secure the entire device in rigid connection with the same.

To subsequently remove the tie clamp, it is but necessary to reverse the above described operation by upward motion of the toggle lever.

The extent of movement of the sliding head in the operation of the toggle is determined by adjustment of the nut so that the tie clamp is readily adapted for application to different sizes of line wire and other variable conditions of the parts to which it is applied.

In the modified construction illustrated in Figures 5, 6 and 7, the toggle of the first described form is replaced by a link-shaped hasp 25 pivotally connected at the end of the sliding head 16, and a spring-catch 26 co-operating with the hasp to lock the head in its adjusted position, takes the place of the stationary curved head 12.

The sliding head is in the modification mounted upon the base of the clamp by flanges 27 turned over and upon the longitudinal edges thereof, thereby eliminating the provision of a bolt and nut as in the other form.

The modification illustrated in Figures 9 and 10 differs from the devices hereinbefore described in that the clamping members which engage beneath the head of the insulator are provided in the form of hook-shaped rigid claws 28 at the opposite outer ends of the base member 10 and the sliding head 16. In this form of the invention, the bifurcated head on the base plate may be at right angles thereto as shown at 29 and a forked eccentric 30 at the end of the toggle lever 13 may replace the curved extremity 21 of the first described form of the invention, which pivotally connects with the link 23.

Having thus described my invention, what I claim and desire to secure by Letters Patent is:

1. A tie clamp for insulators comprising a base having a fixed head, a sliding head, clamp members adapted to engage beneath the top of an insulator and pivoted on the base and the sliding member for lateral movement relative thereto, and means cooperating with the stationary head to move the sliding head and thereby tension the clamp members.

2. A tie clamp for insulators, comprising a base having a fixed curved head, a sliding head, clamp members fastened to the heads and adapted to engage beneath the top of an insulator, and means for moving the sliding head, including a lever engaging the curved head, a screw threaded link connected with the lever, and a nut on the link engaging the sliding head.

3. A tie clamp for insulators comprising a base having a fixed head, a sliding head, resilient clamp members projecting laterally at opposite sides of the base and pivoted on the base and on the sliding head, and camming means cooperating with the stationary head to tension the clamp members by movement of the sliding head, and to lock the same in tensioned position.

4. A tie clamp for insulators comprising a base, a sliding head thereon, laterally extending resilient clamp members pivoted on the base and on the sliding head, and means on the base for moving the sliding head and thereby tensioning the clamp members.

5. A tie clamp for insulators comprising a base having a fixed head, a relatively movable head, clamp members movably fastened to the heads and adapted to engage beneath the top of the insulator by adjustment of the movable head, and mechanism cooperating with the fixed head on the base to adjust the movable head to an operative position.

6. A tie clamp for insulators comprising a fixed member provided with means adapted to engage and position a line wire on an insulator, a relatively movable member secured to and carried by said fixed member, a clamping element attached to and connecting said members and engageable with an insulator, and means mounted on said fixed member and engageable with said movable member for locking said members in an adjusted position.

7. A tie clamp for insulators, comprising a fixed member, a movable member secured to and carried by the fixed member, a clamping element attached to said members for clamping said members to an insulator, and an adjustable link on one of said members cooperating with the other of said members for locking said members in an adjusted position.

8. A tie clamp for insulators comprising a fixed member having means thereon adapted to engage and position a line wire on an insulator, a relatively movable member secured to and carried by the fixed member, clamping means comprising elements secured to said members and adapted to clampingly engage the insulator at opposite sides thereof, and tensioning means mounted on said fixed member and cooperating with both of said members to hold the elements in operative position.

9. The combination with an insulator and a line wire supported thereon of a tie clamp positioned across the top of the insulator, said clamp having means thereon to engage and hold the wire against lateral displacement while leaving the wire free for longitudinal movement, said clamp having clamping elements pivoted thereto for lateral movement into and out of engagement with said insulator.

10. A tie clamp for insulators comprising a fixed member having means thereon adapted to engage and position a line wire on an insulator, a relatively movable member secured to and carried by the fixed member, clamping elements mounted on said clamp for attaching same to an insulator, and means mounted on one of said members and engageable with the other of said members for locking the members in their adjusted positions, said means including an adjustable link.

In testimony whereof I have affixed my signature.

ROY G. DICKINSON.